United States Patent [19]
Killion et al.

[11] Patent Number: 5,857,388
[45] Date of Patent: Jan. 12, 1999

[54] BALANCE SHAFTS HAVING MINIMAL MASS

[75] Inventors: David L. Killion, Clarkston; Michael D. Hendrian, New Hudson; Robert J. Crist, Whitmore Lake, all of Mich.

[73] Assignee: Simpson Industries, Inc., Plymouth, Mich.

[21] Appl. No.: 677,085

[22] Filed: Jul. 9, 1996

[51] Int. Cl.⁶ ............................ F16C 3/20; F02B 75/06
[52] U.S. Cl. .......................................... 74/603; 123/192.2
[58] Field of Search ........................... 74/603, 604, 591; 123/192.2, 192.1

[56] References Cited

U.S. PATENT DOCUMENTS

| | | | |
|---|---|---|---|
| 4,617,885 | 10/1986 | Oshiro et al. | 74/603 X |
| 4,741,303 | 5/1988 | Kronich | 74/603 X |
| 4,819,505 | 4/1989 | Takubo et al. | |
| 5,174,257 | 12/1992 | Ozawa | 74/603 X |
| 5,230,311 | 7/1993 | Kuhn et al. | 74/603 X |
| 5,253,547 | 10/1993 | Yoneyama et al. | 74/604 |
| 5,483,932 | 1/1996 | Friedman et al. | 74/603 X |
| 5,535,643 | 7/1996 | Garza | 74/603 |

*Primary Examiner*—Charles A. Marmor
*Assistant Examiner*—Mary Ann Battista
*Attorney, Agent, or Firm*—Lyon & Artz, P.L.C.

[57] ABSTRACT

A balance shaft for rotating machinery such as a vehicle engine which minimizes the mass or weight of the balance shaft by optimizing the material usage in accordance with the standards and parameters established for the balance shaft. For rotating couple-type shafts, the two balance weights each have surfaces substantially forming hyperbolic curves. In addition, the connector portion between the balance weights has a cross-section with recessed sides in order to reduce the mass or weight of the balance shaft. For single unbalance-type shafts, the connector portion also has a cross-section with recessed sides.

37 Claims, 6 Drawing Sheets

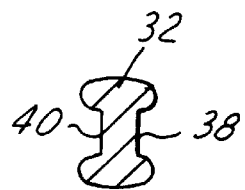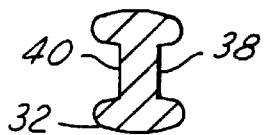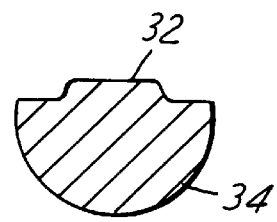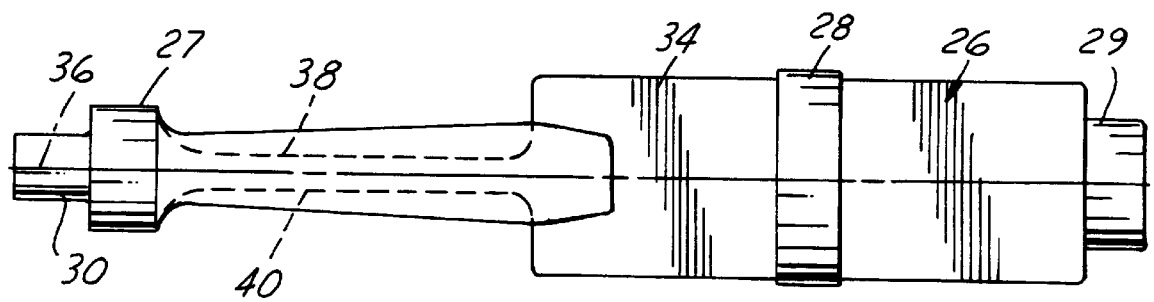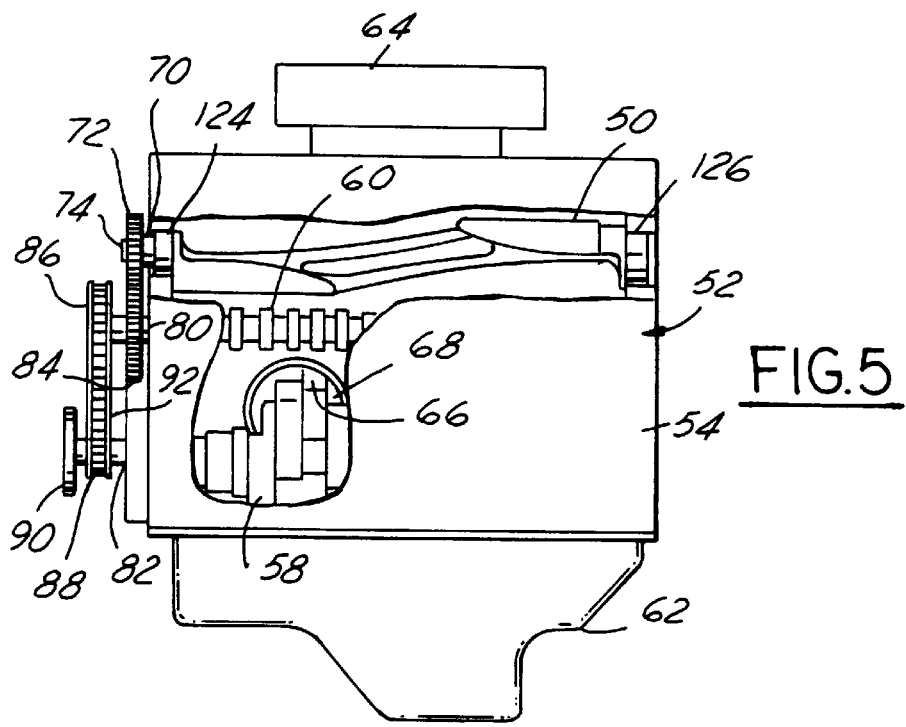

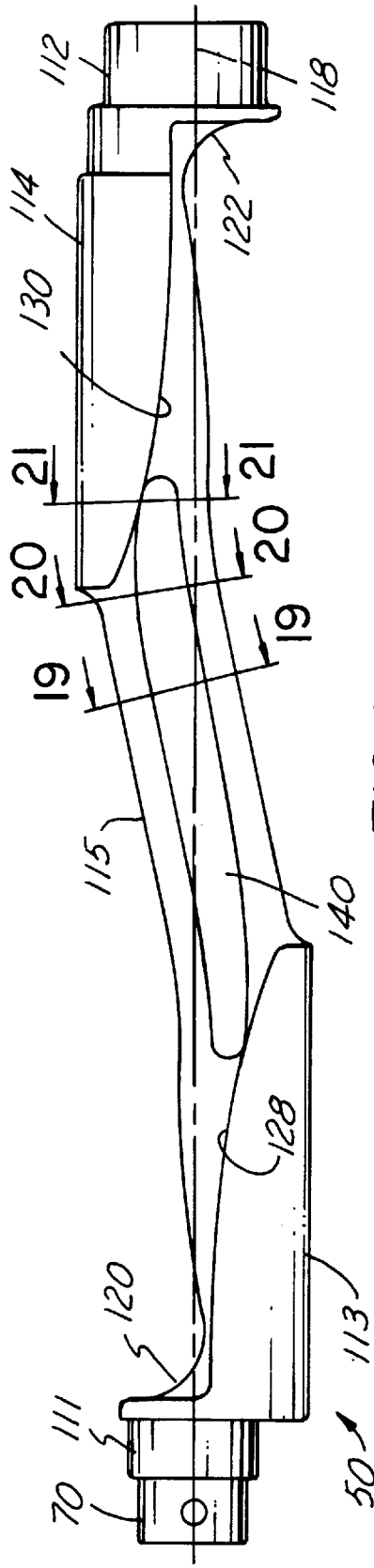
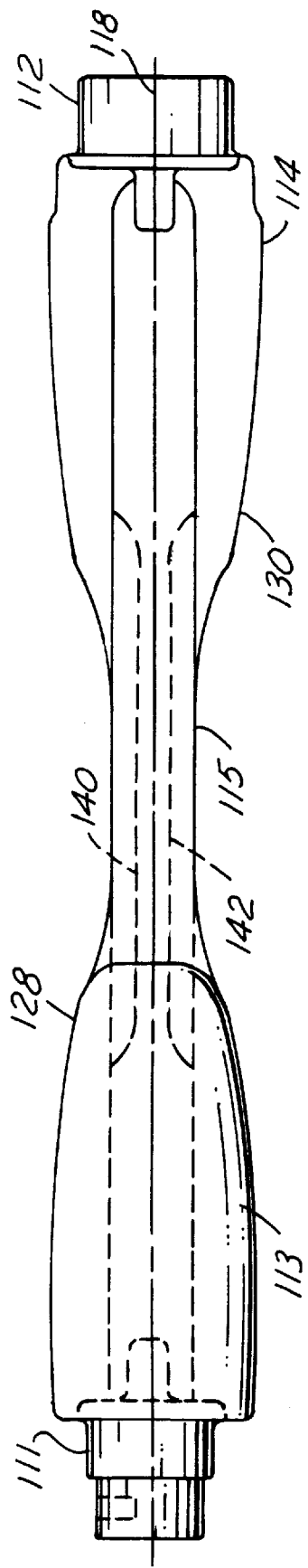
FIG.9
FIG.10

BALANCE SHAFTS HAVING MINIMAL MASS

TECHNICAL FIELD

The present invention relates to balance mechanisms for rotating machinery, particularly balance shafts for multicylinder internal combustion engines which exhibit shaking forces and/or rotating imbalance couples.

BACKGROUND ART

Balance shafts are commonly used to reduce or cancel shaking forces and/or vibrations which result from residual imbalances inherent in the design architecture of machinery with rotating parts or mechanisms, such as motors. These balance shafts are sometimes called "counterbalance" shafts.

Balance shafts are particularly valuable when operator or passenger comfort and freedom from noise and vibration-related fatigue or distraction are desired, as in the case of motor vehicles such as automobiles, motorcycles, and the like. It is also advantageous to minimize vibration from the standpoint of equipment reliability. Where vibrations are reduced, the size, mass and/or complexity of the mounting structures can often also be reliably reduced, thus potentially reducing cost.

With multicylinder motor vehicle engines, the inline four-cylinder engines and 90-degree V-6 engines are favored in automotive use today due to their space efficiency and cost. Both of these engine architectures benefit from balance shafts, although for different reasons and vibratory characteristics, and thus require distinctly different balance shaft arrangements.

Balance shafts for inline four-cylinder engines typically are paired to rotate in opposite directions at twice the engine speed. The two balance shafts cancel each other's lateral shaking forces while opposing the vertical secondary shaking forces that are typical with this type of engine. Each shaft produces a single unbalance force, which taken together with its mating shaft's unbalance force, produces a resultant vertical shaking force located centrally among the bank of cylinders. These "single unbalance" type shafts are shown, for example, in U.S. Pat. No. 4,819,505.

Other engines, such as 90-degree V-6 engines (i.e., six-cylinder engine with two sets of three cylinders spaced 90-degrees apart), produce resultant imbalance forces in the form of a crankshaft-speed rotating couple. These engines benefit from a single balance shaft with two balance "weights", or masses, on opposite sides of its axis of rotation, but spaced apart axially so as to have a dynamic imbalance providing a rotating couple. The couple produced by the balance shaft is designed to oppose or cancel that of the engine when the shaft is rotated at crankshaft speed and in the opposite direction to the crankshaft. The axial location of this "rotating couple"-type shaft relative to the engine is not critical since the output of the balance shaft is a pure couple or torque on the crankcase.

Balance shafts of both types frequently incorporate an elongated support member, or shaft, which provides a structural connection between the balance weights, in the case of the rotating couple-type shaft, or between the centrally located balance weight(s) and a driving member, in the case of the single unbalance-type shaft. The elongated support member is subjected to both torsion and bending forces, and thus must be substantial enough to fulfill structural requirements. Since the mass of the elongated support member is largely "dead weight" and has little, if any, contribution to unbalance, its mass can be reduced in applications where overall mass is a factor in product cost and/or operating efficiency. These elongated support members or shafts typically have a circular cross-section. This circular section represents a structurally inefficient distribution of material that causes the components and their support structures to be more massive and often more costly than necessary.

The room or space for placement of balance shafts in the engine is typically small or limited. Balance shafts usually are constrained to operate within specified radii, whether to clear mating parts or to enable installation. Thus, efficient material usage typically motivates a balance weight cross-sectional shape that is, except for elongated support member intersection areas, "circular segment" in shape, i.e. the area between a radius and a chord. The radius of such a shape represents the clearance boundary beyond which the balance shaft cannot extend without risk of unwanted contact. The chord represents a locus of constant contribution to unbalance within the section, placing elements of mass equidistant from the axis of rotation, with regard to the ability of the mass element to generate centrifugal force in a particular direction, i.e., when viewed from a direction normal to the desired direction of unbalance force.

Typically, the "circular segment" shape of the balance weights are constant along their lengths. This enables easy calculation of their unbalance value from a design standpoint. However, this shape also results in inefficient distribution of material in the case of a rotating couple-type shaft, thus causing components and their support structures to be more massive and thus also often more costly than necessary.

SUMMARY OF THE INVENTION

It is the object of the present invention to provide improved balance shafts for rotating machinery such as motor vehicle engines by enabling balance shaft design configurations which:

1.) result in lighter weight, and thus also potentially lower cost, by means of improved utilization of material in the elongated support member areas of the component for given load conditions;
2.) are stronger, having greater factor of safety for a given material usage, by means of improved utilization of material in the elongated support member areas of the component;
3.) contribute to increased bearing life due to the reduced bearing journal tilt angles that result from increased stiffness (resistance to bending under centrifugal loads) for a given material usage, by means of improved utilization of material in the elongated support member areas of the component;
4.) exhibit increased stiffness (resistance to bending under centrifugal loads) by means of improved utilization of material in the elongated support member areas of the component, with the associated benefit of reduced bearing journal tilt and thus potentially increased operating efficiency by means of smaller, and thus lower drag, bearing sizes;
5.) result in lighter weight and thus also potentially lower cost by means of improved utilization of material in the balance weight areas of the rotating couple type component; and/or
6.) reduce parasitic power loss by means of reduced "windage", or drag from air resistance, due to the reduced "frontal area" and bluntness of smaller, more efficiently shaped balance weights of the rotating couple type component.

The present invention enables the above object to be achieved by providing design methods and structures which result in improved balance shaft configurations having increased stiffness to centrifugal bending loads, increased bearing life, and/or reduced weight, with potential attendant benefits of reduced cost and friction drag. The reduced weight can allow for subsequent weight reductions in associated support structures of the engine or vehicle.

In accordance with one embodiment of the present invention, the cross-sectional shape of the elongated support member or shaft, hereafter referred to as the "connector portion", between the balance weight (s) and the driving means of the single unbalance-type balance shaft, is formed in an optimized manner to minimize material usage while maintaining required bending stiffness, torsional stiffness, and safe levels of mechanical stress. The cross-section of the connector portion is shaped substantially like an "I-beam" with recessed or concave portions. This improves the ratio of section modulus to mass in the direction of the centrifugal loads, which in turn reduces the peak stress for a given material usage. Optimization of the connector portion may involve tapering, such that the "I-beam" varies in section along its length to address the variation in bending moment along its length As to another embodiment of the present invention, namely rotating couple-type balance shafts, one of the surfaces on each of the balance weights of the shaft is preferably shaped as a hyperbolic curve or an approximation thereof. The hyperbolic curve represents the locus of constant contribution to the unbalance couple produced by the shaft. There is a unique and preferred hyperbolic curve for each combination of unbalance value and balance weight clearance boundary conditions.

The cross-sectional shape of the connector portion between the balance weights of the rotating couple-type balance shaft is also formed in an optimized manner to minimize the material usage. The cross-section of the connector section is shaped substantially like an "I-beam" with recessed or concave portions. This improves the ratio of section modulus to mass in the direction of the centrifugal loads, which in turn reduces the peak stress for a given material usage.

Other benefits, features and advantages of the present invention will become apparent from the following written description of the invention, when taken in accordance with the appended claims and accompanying drawings.

BRIEF DESCRIPTION OF THE DRAWINGS

FIGS. 3A, 3B and 3C are cross-sectional views of the balance shaft shown in FIG. 3, the cross-sectional views being taken along lines 3A—3A, 3B—3B and 3C—3C, respectively, in FIG. 3 and in the direction of the arrows;

FIG. 4 is a top view of the single unbalance-type shaft shown in FIG. 3;

FIG. 5 is a side elevational view of an automobile engine incorporating a rotating couple-type balance shaft in accordance with the present invention;

FIG. 9 is a side elevational view of a rotating couple-type balance shaft in accordance with the present invention;

FIG. 10 is a bottom elevational view of the rotating couple-type balance shaft as shown in FIG. 9;

BEST MODE(S) FOR CARRYING OUT THE INVENTION

Figure 1:
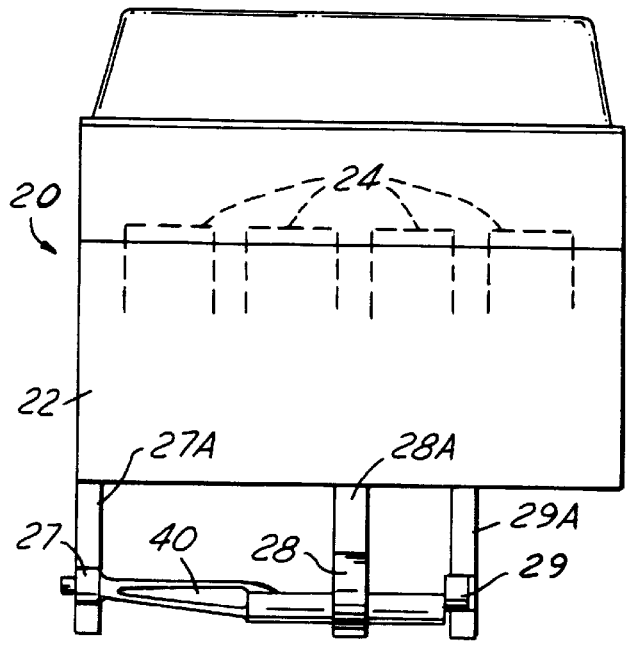
FIG. 1 is a side view of an inline four-cylinder engine incorporating two single unbalance-type shafts.

Preferred embodiments of the present invention are shown in the drawings. The present invention particularly relates to improved "single unbalance"-type balance shafts, which are shown in FIGS. 1–4 of the drawings, and rotating couple-type balance shafts, which are shown in FIGS. 5–21 of the drawings.

Figure 2:
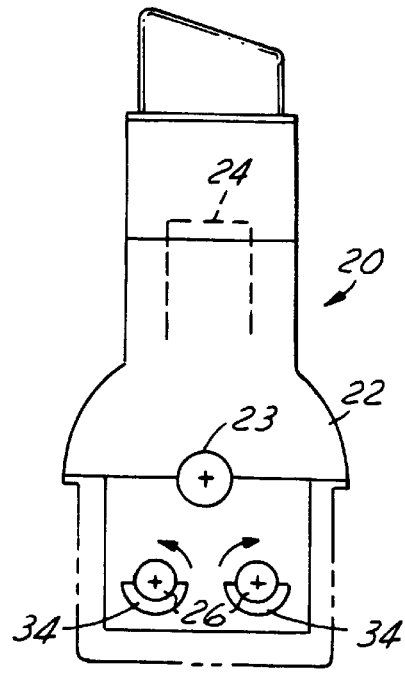
FIG. 2 is a front view of the engine shown in FIG. 1.

FIGS. 1 and 2 show the side and front views, respectively, of an inline four-cylinder automobile engine 20. The engine has an engine block 22 and a crankshaft 23 which is rotated by the rods connected to the pistons 24 in the engine. A pair of balance shafts 26 is used to reduce or cancel shaking forces and/or vibration caused by the movement of the reciprocating components in the engine 20. The balance shafts 26 are "single unbalance"-type shafts and each produces a single unbalanced force. The two balance shafts 26 cancel each others' lateral shaking forces, while opposing the vertical secondary shaking forces that are caused by the engine 20.

Each of the balance shafts is typically held in position by bearings 27, 28 and 29. These bearings are held in bearing seats 27a, 28a and 29a, respectively, as shown in FIG. 1. Although the location and support for only one of the two balance shafts 26 are shown in FIG. 1, the second balance shaft of the pair of balance shafts for the engine 20 is positioned and held in place in substantially the same manner.

Figure 3:
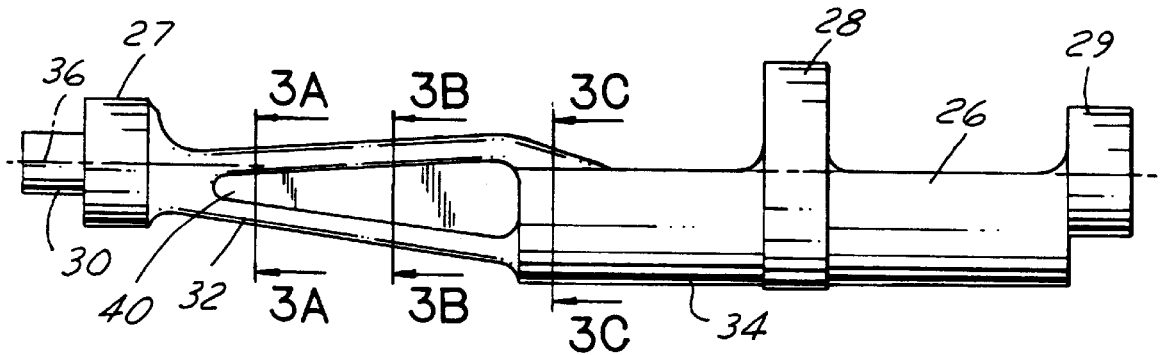
FIG. 3 is a side view of a single unbalance-type shaft for use in an inline four-cylinder engine.

FIGS. 3 and 4 show the side and top views, respectively, of one of the two single unbalance-type balance shafts 26. Each of the balance shafts 26 has a nose or drive shaft 30 at one end, a connector portion 32 and a balance weight 34. The connector portion 32 is positioned between bearing surface 27 and one end of the balance weight 34, while bearing surface 29 is positioned at the opposite end of the balance weight. Bearing surface 28 is positioned in approximately the middle of the length of the balance weight 34. The balance shaft 26 rotates around its central axis 36. The balance weight 34 is semi-circular in shape, which is shown more clearly in FIGS. 2 and 3C.

The connector portion 32 has a pair of recesses or channels 38 and 40 on opposite sides thereof. The recesses 38 and 40 significantly reduce the overall weight of the balance shaft 26 without significantly sacrificing strength or stiffness of the balance shaft. FIGS. 3A, 3B and 3C show the cross-sectional size and shape of the connector portion 32 at various positions along its length. Alternatively, if desired, only one recess could be provided in the connector portion.

Figure 6:
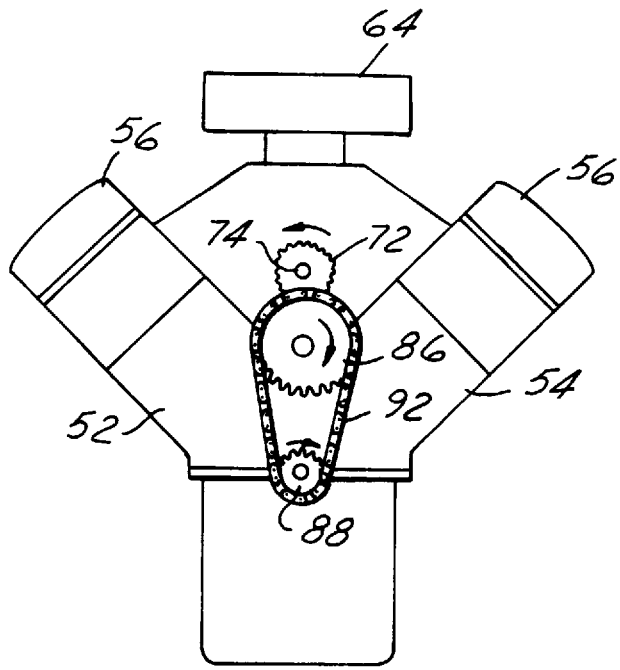
FIG. 6 is a front elevational view of the engine shown in FIG. 5.

Another embodiment of the invention relates to rotating couple-type balance shafts which are used to reduce or cancel vibration and/or shaking forces caused by certain engines, such as the V-6 engine 52 shown in FIGS. 5 and 6. Engine 52 is a 90-degree V-6 engine. These engines, due to their structure and geometry, produce an imbalance couple which rotates in the opposite direction of the crankshaft, and can thus significantly benefit from a counter-rotating balance shaft of the rotating couple-type. The couple produced by the balance shaft is designed to oppose or cancel that of the engine when the balance shaft is rotating at crankshaft speed and in the opposite direction.

The inventive balance shaft is generally indicated by the numeral 50 in the drawings. The engine 52, in which the balance shaft 50 is situated, generally comprises a cylinder block 54, a pair of cylinder heads 56, a crankshaft 58, a cam shaft 60, an oil pan 62 and an air cleaner 64. A plurality of pistons 66 are positioned in cylinders 68 and connected to the crankshaft.

A nose or drive shaft 70 on the balance shaft 50 protrudes outside the front of the cylinder block 54 and has a drive gear or sprocket 72 attached to it. The gear 72 is attached in any conventional manner, such as bolt 74. Gear 72 is also oriented to the drive shaft 70 by a slot and key mechanism (not shown) or by any other conventional means.

The camshaft 60 and crankshaft 58 also have noses or drive shafts 80 and 82, respectively, which protrude outside the front of the cylinder block 54. Nose 80 of camshaft 60 is secured to drive gear 84 and sprocket 86. The nose 82 of crankshaft 58 is secured to drive sprocket 88. A vibration damper 90 is also preferably attached to the nose 82 of the crankshaft 58. Sprockets 86 and 88 are connected by a conventional drive chain or toothed timing belt 92. Drive gear 84 is meshed with gear 72 on the balance shaft 50.

Sprockets 86 and 88 are both rotated in the same direction by the drive chain or toothed timing belt 92, as shown in FIG. 6. The respective sizes and diameters of sprockets 86 and 88 are such that the crankshaft 58 rotates at twice the speed of the camshaft 60.

The meshing of gears 72 and 84 causes the balance shaft 50 to rotate in a direction opposite to that of the crankshaft and thus counterbalance the vibrations caused by the engine 52. The size and diameters of the gears 84 and 72 determine the rotational speed of the balance shaft 50. Typically, shaft 50 is rotated at twice the speed of the camshaft 60, and the same speed as the crankshaft 58.

Figure 7:
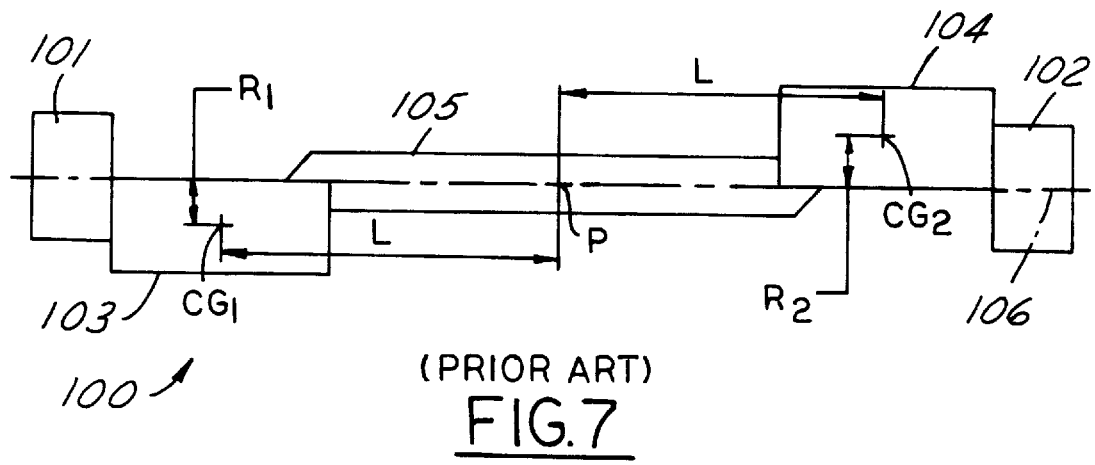
FIGS. 7 and 8 depict schematic diagrams of a typical rotating couple-type balance shaft illustrating the weights, forces and moments associated therewith.
Figure 8:
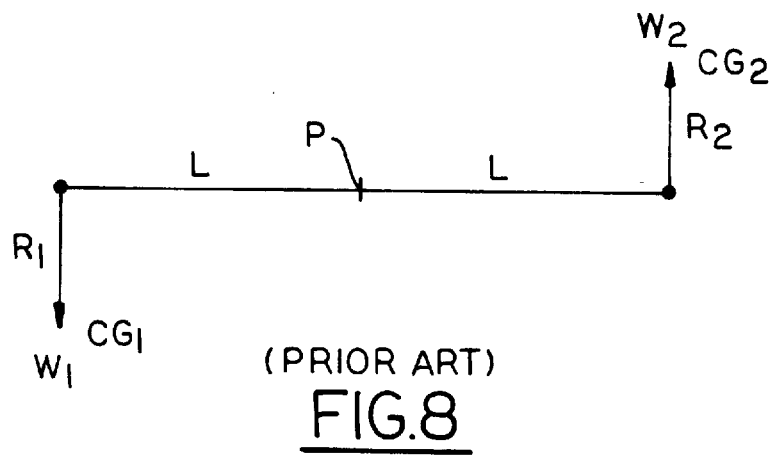

The shape and characteristics of a conventional rotating couple-type balance shaft are shown schematically in FIGS. 7 and 8. As shown in FIG. 7, the balance shaft 100 has a pair of bearing surfaces 101 and 102, a pair of balance weights 103 and 104 and a connector portion 105. The balance weights 103 and 104 have centers of gravity "$CG_1$" and "$CG_2$", respectively, at the points shown. The balance shaft 100 rotates about a central longitudinal axis 106. As shown, the balance weights 103 and 104 are on opposite sides of the axis 106. The cross-sectional shapes of the balance weights 103 and 104 can be of any cross-section, but typically are "circular segment" shaped, where the straight inside edge of the weight represents constant contribution to unbalance within the section.

The balance shaft's unbalance couple "$C_u$" required to offset that of the engine is based on the masses and geometry of the engine. This is calculated by conventional methods known in the art. The unbalance couple can be expressed by the equation $$C_u = LR_1W_1 + LR_2W_2 \tag{1}$$

where L is one-half the length or distance between the centers of gravity $CG_1$–$CG_2$ of the balance weights, $R_1$, and $R_2$ are the distances from the axis of rotation 106 to the centers of gravity of the balance weights, and $W_1$ and $W_2$ are the masses or weights of the balance weights. These distances and weights are expressed in the diagram shown in FIG. 8.

When the engine is designed, the dimensions of the cavity for placement of the balance shaft are determined. In this regard, the length between the bearings which house the bearing surfaces 101 and 102 is determined, together with the clearance boundary radius/radii of the balance shaft. The shape and configuration of the balance shaft is constrained within these boundaries. As a result, in accordance with equation (1) set forth above, if it is desired to decrease the weights W of the balance weights, then the distances L or R can vary to the extent permitted by the boundary conditions in order to meet the requisite couple $C_u$ for the engine.

A rotating couple-type balance shaft 50 made in accordance with the present invention is shown in FIGS. 9 and 10. The balance shaft 50 has a pair of bearing surfaces 111 and 112, a pair of balance weights 113 and 114 and a central connector portion 115 which extends between the balance weights. The balance shaft rotates about a longitudinal axis 118.

The balance weights 113 and 114 may have curved or straight gusset portions 120 and 122 which are used to integrally connect the balance weights to the bearing surfaces 111 and 112, respectively. These add strength to the structure.

Surfaces 111 and 112 on the ends of the balance shaft are manufactured in order to allow proper fitting in bearings 124 and 126, respectively, in the engine (as shown in FIG. 5). When the balance shaft 50 is mounted in the engine 52, bearings 124 and 126 are positioned to allow the balance shaft to rotate freely. The nose 70 of the balance shaft 50 is positioned at one end of the balance shaft and is configured to extend outside the cylinder block 54 and be connected to the drive gear 72, as discussed above. As indicated earlier, the drive gear 72 rotates the balance shaft 50 in the direction and at the speed desired for the engine.

Although the drawings and above description disclose that the balance shaft is mounted in the engine by bearings positioned at the two ends of the balance shaft, it is also possible to position the bearings at intermediate positions spaced from the ends of the shaft, for example within the length of the balance weights. Further, more or less than two bearings can be provided.

Surface 128 of balance weight 113 and surface 130 of balance weight 114 are manufactured to have a curved surface. As shown in FIG. 10, the curves of the surfaces 128 and 130 also allow the sides of the balance weights 113 and 114 to form curves which taper from the bearing surfaces 111 and 112 toward the connector portion 115.

In accordance with the present invention, the surfaces 128 and 130 are formed as hyperbolic curves, or approximations of hyperbolic curves. This feature is better shown in FIG. 11. In that Figure, one half of balance shaft 50 is shown superimposed on an X–Y grid. The axis of rotation 118 of the balance shaft is aligned along the X-axis, and the intersection of the X and Y axes is positioned at the center P of the couple. As shown, the curve of the surface 130 of balance weight 114 is formed along a hyperbola in accordance with the equation:

$$(X) \times (Y) = C \tag{2}$$

The desired output of the rotating couple-type shaft is a pure couple of specific magnitude. This output requires that both unbalances $(R_1) \times (W_1)$ and $(R_2) \times (W_2)$ be equal, or a couple plus a residual unbalance will result. Thus the "half moment" distance L can be defined, in simplification (for purposes of discussion and as shown in FIGS. 7 and 8) of the more general equations summing forces and moments, as also equal for each side, namely the axial distance from one CG to point P midway between the CG's.

Figure 11:
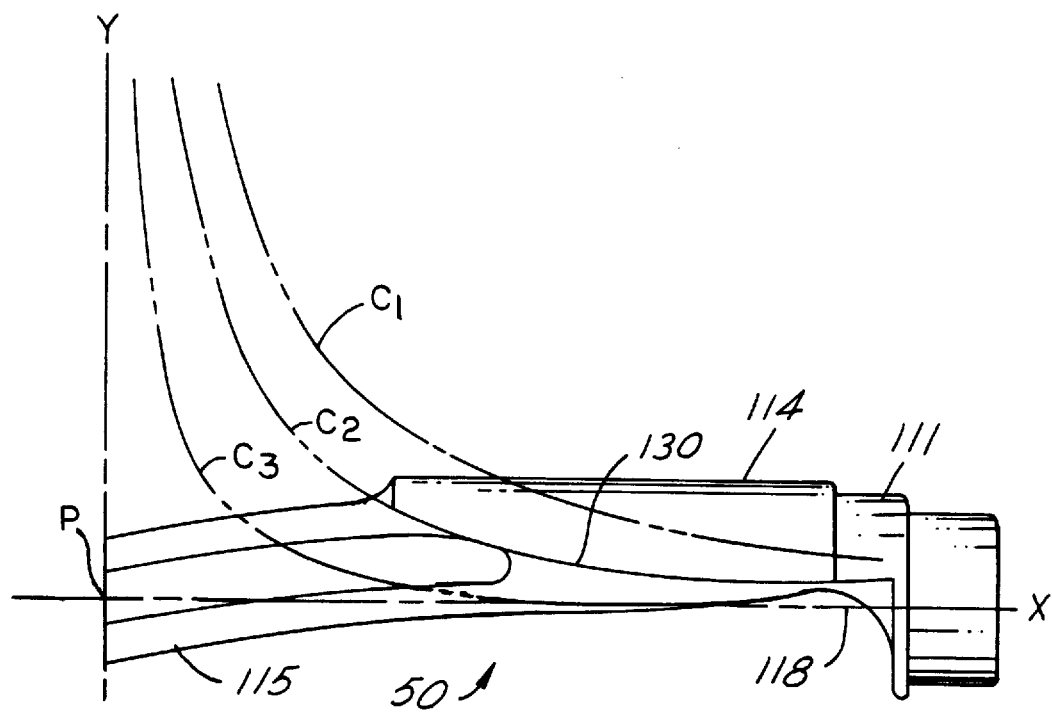
FIG. 11 illustrates a manner in which the hyperbolic shape of the curved surfaces can be determined for the balance weights for a rotating couple-type balance shaft in accordance with the present invention.

Disregarding also for purposes of simplifying the discussion, the unbalance contributions due to connector portions, gussets, and the like, it may be seen that the contribution to the magnitude of the rotating unbalance couple made by any element of mass within the balance weight is a function of that element's location, specifically the product of its axial distance from the centerline of the unbalance couple and its radial distance from the shaft's rotational centerline, when viewed normal to the plane of the unbalance couple as in FIGS. 7, 9 and 11. From this, it can be seen that locations with an $(X) \times (Y)$ product greater than a reference value "C" represent more efficient use of material than locations having lesser products. Therefore, in order to secure mass reduction for balance shafts of the rotating couple-type in accordance with the present invention, mass (balance weight material not dedicated to structural purposes such as connector portions, gussets and the like) is relocated from low $(X) \times (Y)$ product locations to more efficient locations having products greater than or equal to a reference value "C".

Figure 12:
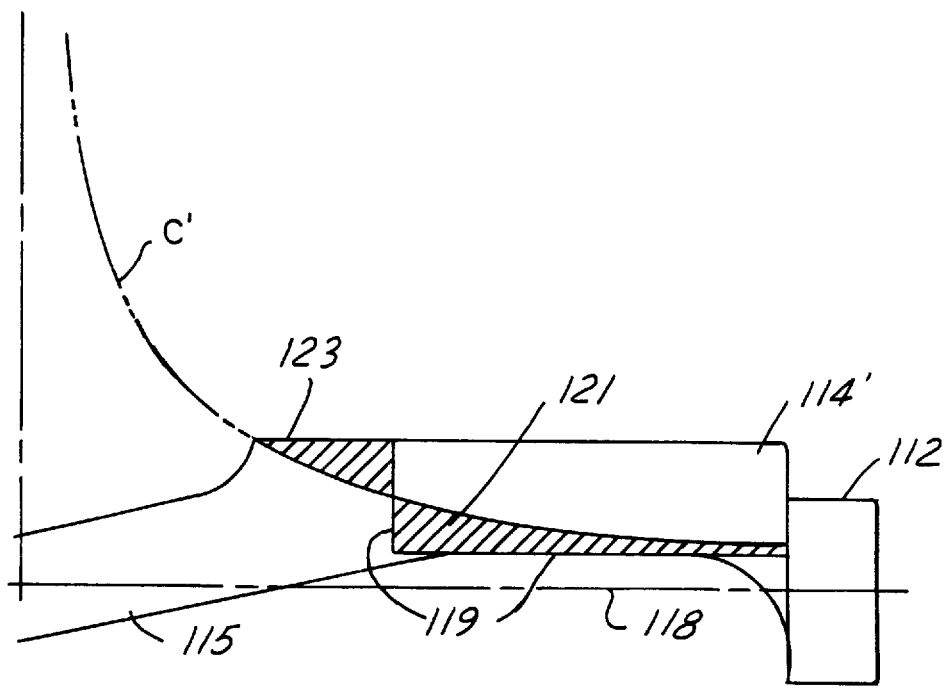
FIG. 12 illustrates the relocation of inefficient mass on a balance shaft to make it efficient in accordance with the present invention.

A general representation of this relocation is shown in FIG. 12. In that Figure, the profile of a typical rectangular counterweight 114' is indicated by the reference numeral 119. The balance shaft rotates around axis 118 and has a connector portion 115. The inefficient portion 121 of the counterweight mass is situated below the envelope or area defined by hyperbolic curve C'. In accordance with the present invention, the inefficient mass portion 121 is effectively relocated to position 123 above the hyperbolic curve C' on the balance shaft in order to provide the required unbalance moment with less material.

The preferred mode for the present invention for rotating couple-type shafts is to add or subtract material uniformly along the full length of the side elevation hyperbolic surfaces defined by the equation $(X) \times (Y) = C$, or $Y = C/X$. The value of C is adjusted until the target unbalance couple magnitude is reached and after a full utilization of the clearance boundary radius/radii has been made.

In cases where a single radius defines the clearance boundary envelope, the balance shaft will be symmetrical (except for the effects of differences in features dedicated to structural purposes), having common C value for both of the balance weights. Where clearance boundary conditions differ, i.e., where multiple radii define different envelope sizes or shapes for the two balance weights, mass optimization will involve use of differing values for C in order to equate $(R) \times (W)$ unbalances between the two balance weights. The differing C values will result in differing CG locations, thus influencing the distance between CG's, and hence the value of distance L, which is a determinant in the unbalance moment's magnitude. In this case of differing boundary conditions, it will be necessary to determine the distinctly different C values that will provide for the target unbalance couple magnitude while fully utilizing the clearance boundary envelope, in order to avoid any residual unbalance which would result from unequal $(R) \times (W)$ unbalance values.

Figure 13:
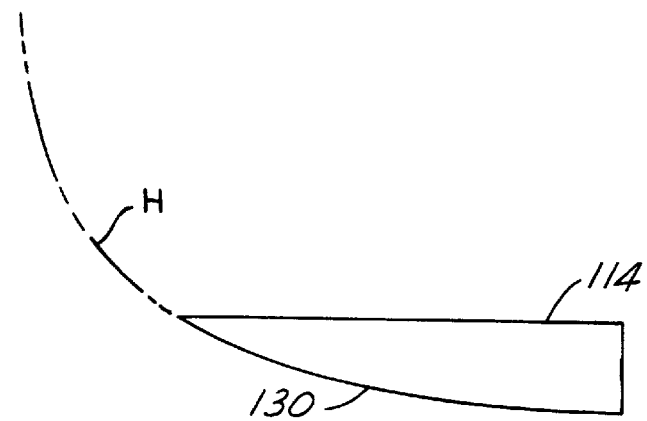
FIGS. 13–18 illustrate alternate embodiments of balance weights in accordance with the present invention.

It is preferred that the shape of the surface 130 be a curve of a true hyperbola (as shown in FIGS. 11 and 13). In FIG. 13, the hyperbolic shape is shown by phantom line H which is a continuation of the curve which forms surface 130 on balance weight 114.

Figure 14:
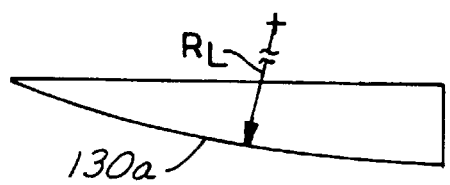
Figure 15:
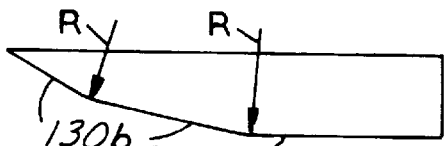

It is also possible in accordance with the present invention, however, for the surface 130 to have a shape that is a reasonable approximation of a hyperbolic curve. Examples of these are shown in FIGS. 14–18. For example, as shown in FIG. 14, the surface 130*a* has a generally curved surface. Surface 130*a* is formed as part of a large circle having radius $R_L$. In FIG. 15, a series of straight line segments 130*b* are used to approximate the hyperbolic shape. In this regard, although three straight line segments are shown in FIG. 15 approximating a hyperbolic curve, it is understood that any number of straight line segments could be utilized.

Figure 16:
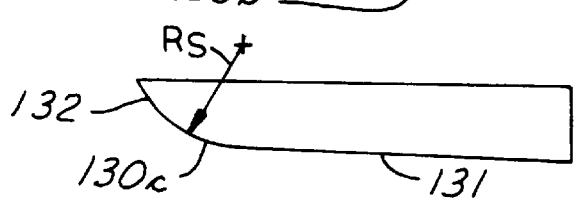
Figure 17:
Figure 18:
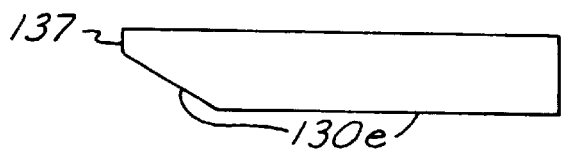

In FIG. 16, the curved surface 130*c* is formed from a combination of a straight line 131 and a curved line 132. In this regard, the curved portion 132 is formed as a part of a small circle having radius $R_s$. As shown in FIG. 17, the curved surface 130*d* is formed as a truncated hyperbola 133 with a blunt end portion 135. Also, in FIG. 18, the hyperbolic curve is approximated by a series of straight lines 130*e* and has a truncated or blunt end 137. It is understood that the blunt end portion 137 can be used with any of the previous contour variations. A blunt end 137 can be provided, for example, due to manufacturing and/or design considerations.

Moreover, it is also possible that the shape of surface 130 could be a portion of another geometric figure, such as a portion of a parabola or an ellipse, and still constitute a reasonable approximation of a hyperbolic curve or shape.

As stated above, in accordance with the present invention, the curved shape of the balance weight allows the product of the length L which extends from couple midpoint P to the centers of gravity $CG_1$ and $CG_2$ of the balance weights and the radii $R_1$ and $R_2$ to the CG's (see FIGS. 7 and 8), to be maximized by means of material distribution along the hyperbolic surface 130, thus avoiding inefficiently located material which would fall below the threshold of "equal efficiency," i.e., having constant contribution to unbalance. (This is shown in FIG. 12 where the curve is designated by the letter C'.) This in turn allows the mass or weight W of the balance weights to be minimized.

The particular curve actually utilized for the balance weights of the balance shaft, such as curve $C_2$ which forms surface 130 in FIG. 11, is selected in accordance with the length and weight parameters afforded by the engine's clearance envelope and the correcting couple needed. In this regard, as shown in FIG. 11, a balance weight having a curved surface along curve $C_1$ would provide a lower unbalance moment, while curve $C_3$ a greater unbalance moment, than curve $C_2$. The needed unbalance couple is thus obtained by means of the appropriate value(s) for constant C, thus avoiding unnecessary weight or mass.

Figure 19:
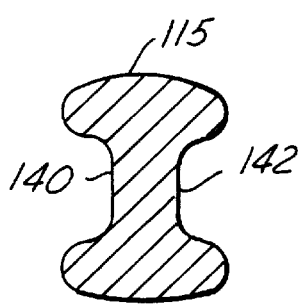
FIGS. 19–21 are cross-sectional views of the balance shaft shown in FIG. 9, the cross-sectional views being taken along the lines 19—19, 20—20 and 21—21, respectively, in FIG. 9 and in the direction of the arrows.
Figure 20:
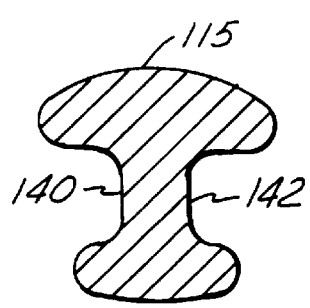
Figure 21:
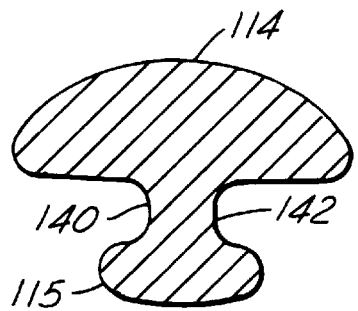

Also in accordance with the present invention, the cross-sectional size and shape of the connector portion 115 is optimized for given load conditions in order to minimize its mass and thus the weight of the balance shaft 50. FIGS. 19, 20 and 21 illustrate a preferred shape of the connector portion 115 of the balance shaft 50 shown in FIGS. 9 and 10.

As shown in FIGS. 19–21, the sides 140 and 142 of the connector portion 115 are recessed or shaped in a concave manner. This lightens or reduces the weight of the balance shaft without significantly reducing its resistance to bending in the plane of balance weight centrifugal loading. Essentially, the cross-sectional shape of the connector portion 115 has a generally "I-beam" shape. This maximizes the section modulus in the direction of the centrifugal loads.

This in turn minimizes the peak stress for a given amount of material usage. Alternatively, only one recess could be provided in the connector portion.

FIG. 21 shows a cross-sectional view of the balance shaft 50 including a portion of the connector portion 115 and a portion of the balance weight 114. As shown, the weight or mass of the balance shaft is distributed over a wider area to maintain section modulus and avoid stress concentrations. It is clear that other cross-sectional shapes and proportions for the connector portions 115 and transition areas to the balance weights 114 can be utilized in accordance with the present invention.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A balance shaft comprising:
   a body member having a longitudinal axis, a first end and a second end;
   a first bearing surface adjacent said first end and a second bearing surface adjacent said second end;
   a first balance weight adjacent said first end and a second balance weight adjacent said second end; and
   a connector portion on said body member between said first and second balance weights;
   said first and second balance weights positioned on opposite sides of said longitudinal axis and providing a rotating couple when said balance shaft is rotated around said longitudinal axis;
   said first balance weight having a first elongated surface thereon extending in the direction of said longitudinal axis and said second balance weight having a second elongated surface thereon extending in the direction of said longitudinal axis;
   said first and second elongated surfaces being shaped substantially as hyperbolic curves substantially along the length of said surfaces;
   wherein the masses of the first and second balance weights are minimized.

2. The balance shaft of claim 1 wherein said first and second bearing surfaces are positioned on said first and second balance weights, respectively.

3. The balance shaft of claim 1 wherein said first and second balance weights have the same sizes and shapes.

4. The balance shaft of claim 1 wherein at least two portions of said first and second elongated surfaces comprise straight line segments.

5. The balance shaft of claim 1 wherein at least one portion of said first and second elongated surfaces comprises a curved portion with a constant radius.

6. The balance shaft of claim 1 wherein said first and second elongated surfaces include a truncated portion.

7. The balance shaft of claim 1 wherein at least one portion of said first and second elongated surfaces comprises a straight line segment.

8. The balance shaft of claim 7 wherein at least a second portion of said first and second elongated surfaces comprises a curved portion with a constant radius.

9. The balance shaft of claim 1 wherein said connector portion has at least one elongated recess therein, said recess being elongated in the direction of said longitudinal axis.

10. The balance shaft of claim 9 wherein two of said elongated recesses are provided, one each on opposite sides of said connector portion.

11. The balance shaft of claim 10 wherein the cross-sectional shape of said connector portion with said two elongated recesses has substantially an I-beam shape.

12. A balance shaft comprising:
    a body member having a longitudinal axis, a first end and a second end;
    a first bearing surface adjacent said first end and a second bearing surface adjacent said second end;
    a first balance weight adjacent said first end and a second balance weight adjacent said second end; and
    a connector portion on said body member between said first and second balance weights;
    said first and second balance weights positioned on opposite sides of said longitudinal axis and providing a rotary couple when said balance shaft is rotated around said longitudinal axis;
    said connector portion having at least one elongated recess therein, said recess being elongated in the direction of said longitudinal axis;
    wherein the mass of the balance shaft is minimized.

13. The balance shaft of claim 12 wherein said first and second bearing surfaces, respectively, are positioned on said first and second balance weights.

14. The balance shaft of claim 12 wherein said first and second balance weights have the same sizes and shapes.

15. The balance shaft of claim 12 wherein two elongated recesses are provided, one each on opposite sides of said connector portion.

16. The balance shaft of claim 15 wherein the cross-sectional shape of said connector portion with said two recesses has substantially an I-beam shape.

17. The balance shaft of claim 12 further comprising:
    said first balance weight having a first elongated surface thereon elongated in the direction of said longitudinal axis and said second balance weight having a second elongated surface thereon elongated in the direction of said longitudinal axis; and
    said first and second elongated surfaces being shaped substantially as hyperbolic curves.

18. The balance shaft of claim 17 wherein said first and second elongated surfaces include a truncated portion.

19. The balance shaft of claim 17 wherein at least one portion of said first and second elongated surfaces comprises a curved portion with a constant radius.

20. The balance shaft of claim 17 wherein at least one portion of said first and second elongated surfaces comprises a straight line segment.

21. The balance shaft of claim 20 wherein at least a second portion of said first and second elongated surfaces comprises a curved portion with a constant radius.

22. The balance shaft of claim 20 wherein at least two portions of said first and second elongated surfaces comprise straight line segments.

23. A method of optimizing the mass of a rotating couple-type balance shaft for a vehicle engine, said balance shaft having a pair of bearing surfaces adjacent the ends thereof, a pair of opposed balance weights adjacent the ends thereof, a connector portion between said balance weights, and a longitudinal axis, and said balance weights each having an elongated surface thereon extending in the direction of said longitudinal axis, said method comprising the step of forming the shapes of the elongated surfaces on said balance weights substantially as hyperbolic curves substantially along the lengths of said surfaces.

24. The method of optimizing the mass of claim 23 wherein said balance weights each have the same size and shape.

25. The method of optimizing mass as set forth in claim 23 wherein at least one portion of said elongated surfaces on each of said balance weights comprises a curved portion with a constant radius.

26. The method of optimizing mass as set forth in claim 23 wherein at least one portion of said elongated surfaces on each of said balance weights comprises a straight line segment.

27. The method of optimizing mass as set forth in claim 26 wherein at least a second portion of said elongated surfaces on each of said balance weights comprises a curved portion with a constant radius.

28. The method of optimizing mass as set forth in claim 23 further comprising the step of forming at least one elongated recess in said connector portion, said recess being elongated in the direction of said longitudinal axis.

29. The method of optimizing mass as set forth in claim 28 further comprising the step of forming elongated recesses in two opposed sides of said connector portion, wherein the cross-sectional shape of said connector portion has substantially an I-beam shape.

30. A method of optimizing the mass of a rotating couple-type balance shaft for a vehicle engine, said balance shaft having a pair of bearing surfaces adjacent the ends thereof, a pair of opposed balance weights adjacent the ends thereof, a connector portion between said balance weights, and a longitudinal axis, and said balance weights each having an elongated surface thereon extending in the direction of said longitudinal axis, said method comprising the step of forming at least one elongated recess in said connector portion, said recess being elongated in the direction of said longitudinal axis.

31. The method of optimizing mass as set forth in claim 30 wherein said balance weights each have the same size and shape.

32. The method of optimizing mass as set forth in claim 30 further comprising the step of forming a second elongated recess in said connector portion on a side of said connector portion opposite the side having said at least one elongated recess.

33. The method of optimizing mass as set forth in claim 32 wherein said connector portion has substantially an I-beam shape.

34. The method of optimizing mass as set forth in claim 30 further comprising the step of forming the shapes of the elongated surfaces on said balance weights substantially as hyperbolic curves.

35. The method of optimizing mass as set forth in claim 34 wherein at least one portion of the elongated surfaces on each of said balance weights comprises a curved portion with a constant radius.

36. The method of optimizing mass as set forth in claim 34 wherein at least one portion of the elongated surfaces on each of said balance weights comprises a straight line segment.

37. The method of optimizing mass as set forth in claim 36 wherein at least a second portion of the elongated surfaces on each of said balance weights comprises a curved portion with a constant radius.

* * * * *